United States Patent [19]

Hutter et al.

[11] 4,234,787
[45] Nov. 18, 1980

[54] APPARATUS FOR MONITORING THE MOTION OF SHUTTLES IN LOOMS OR THE LIKE

[75] Inventors: Willi Hutter, Roggwil; Kurt Huber, Arbon, both of Switzerland

[73] Assignee: Aktiengesellschaft Adolph Saurer, Arbon, Switzerland

[21] Appl. No.: 922,574

[22] Filed: Jul. 6, 1978

[30] Foreign Application Priority Data

Jul. 15, 1977 [AT] Austria .................. 5133/77

[51] Int. Cl.³ .......................... G06M 3/06
[52] U.S. Cl. .................. 235/92 MP; 235/92 PD; 235/92 V
[58] Field of Search ........ 235/92 MP, 92 PD, 92 PE, 235/92 V, 92 GC, 103

[56] References Cited

U.S. PATENT DOCUMENTS

| | | | |
|---|---|---|---|
| 2,934,825 | 5/1960 | Braybrook et al. | 235/92 GC |
| 3,024,986 | 3/1962 | Strianese et al. | 235/92 V |
| 3,816,712 | 6/1974 | Herzog | 235/92 MP |
| 3,896,377 | 7/1975 | Richardson | 235/92 MP |

*Primary Examiner*—Joseph M. Thesz
*Attorney, Agent, or Firm*—Peter K. Kontler

[57] ABSTRACT

An apertured disk which is mounted on a shaft in a loom causes a first photocell to transmit a first signal once during each revolution of the shaft in a preselected angular position of the shaft, and a second photocell to transmit a second signal in response to each incremental angular displacement of the shaft through one degree. A counter is reset to zero in response to reception of each first signal, and the counter thereupon counts the second signals until the shuttle of the loom causes the generation of a third signal which is generated when the shuttle reaches a predetermined portion of its path. The counter displays or otherwise indicates the number of second signals which are generated between the generation of a first signal and the generation of the next following third signal. The means for transmitting second signals to the counter is a logic circuit which begins to transmit second signals to the counter on reception of a first signal, and terminates the transmission of second signals to the counter on reception of the next-following third signal. The number of second signals which are stored in the counter when the shuttle causes the generation of a third signal denotes the extent of angular displacement of the shaft from its preselected angular position.

10 Claims, 3 Drawing Figures

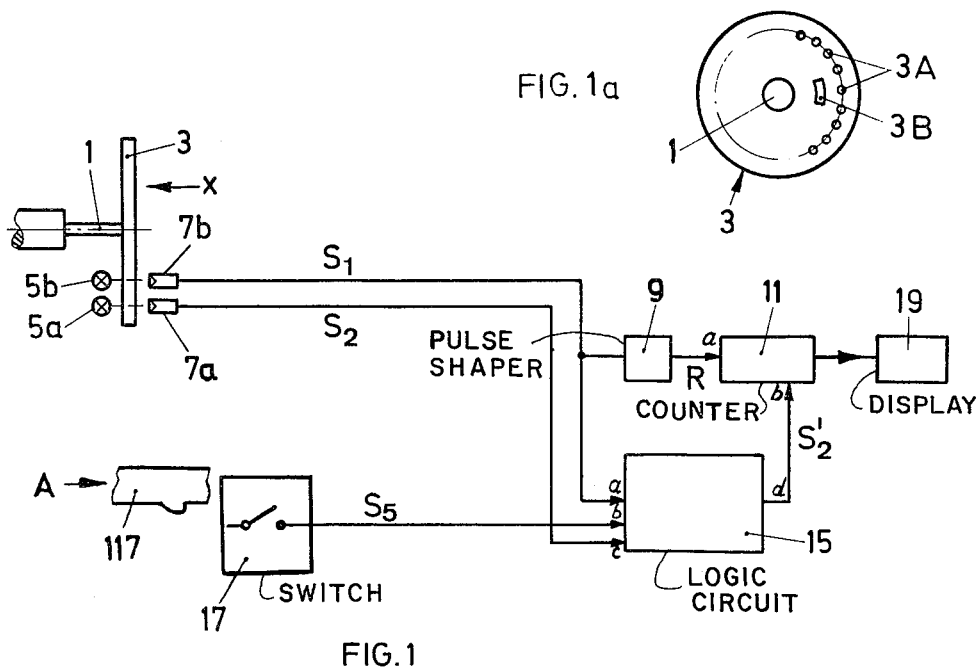
FIG. 1a
FIG. 1
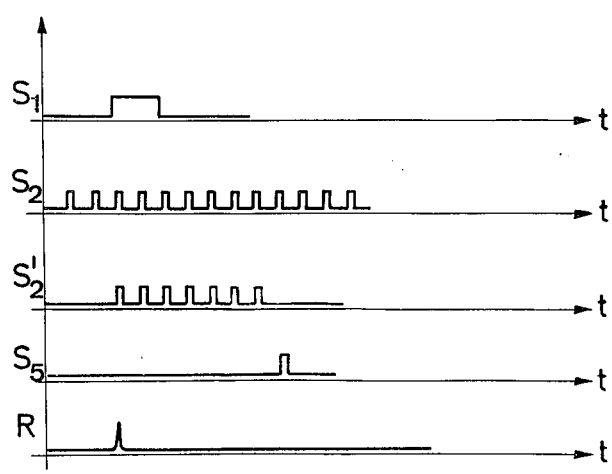
FIG. 2

APPARATUS FOR MONITORING THE MOTION OF SHUTTLES IN LOOMS OR THE LIKE

BACKGROUND OF THE INVENTION

The present invention relates to apparatus for monotoring the extent of recurrent movement of a driven part through a predetermined portion of its path which the driven part may but need not traverse after a second part has moved through a predetermined distance. More particularly, the invention relates to apparatus which can ascertain the extent of angular displacement of a rotary second part from a first or zero position to a second position, wherein the extent of such angular displacement may be less than, equal to or in excess of 360 degrees and wherein the second position is reached when the monitored part traverses the predetermined portion. Still more particularly, the invention relates to improvements in apparatus which can be utilized with advantage to monitor the deviations (if any) of the path of a shuttle in a loom from the standard throw traversed by the shuttle.

Swiss Pat. No. 557,561 to Löpfe discloses an apparatus wherein the determination traversed by deviations of path of the shuttle from standard throw necessitates the measurement of angular velocity of a rotary member, namely, a shaft of the loom. The apparatus ascertains the interval which elapses between the instant of movement of the shaft through a predetermined angular position and the instant of travel of the shuttle in a predetermined portion of its path. The just described monitoring system is complex and the determination of deviations is time-consuming because the interval must be ascertained by calculation. The fact that the angular velocity of the shaft need not be constant also contributes to complexity of the monitoring operation.

Commonly owned Swiss Pat. Nos. 541,808 and 557,542 disclose apparatus for stroboscopically monitoring the deviations of the timing or path of a shuttle from standard throw. Such apparatus exhibit the drawback that the optical system which is incorporated therein is complex, expensive and prone to malfunction.

Certain other apparatus which disclose monitoring means serving a purpose similar to that of the aforementioned Swiss patents are disclosed in U.S. Pat. Nos. 2,670,014 to Hutchinson and 3,326,246 to Gurney, in Swiss Pat. No. 578,634 to Hänel, in French Pat. No. 2,311,874 to Nissan Motor Company, Ltd., and in German Printed Publications Nos. 2,264,779 to Suzuki, 2,543,045 to Kakinaka and 2,063,810 to Wesseler.

OBJECTS AND SUMMARY OF THE INVENTION

An object of the invention is to provide a monitoring apparatus which is simpler and more reliable than heretofore known monitoring apparatus.

Another object of the invention is to provide a monitoring apparatus which need not ascertain or take into consideration the variations (if any) of the speed of that part which initiates the generation of signals serving for determination of deviations (if any) of the time of travel of a shuttle through a predetermined portion of its path or the like from standard time of travel through this portion.

A further object of the invention is to provide an apparatus which can be utilized to ascertain the discrepancies (if any) between the occurrence of two recurring events at a mobile component one of which occurs at a predictable first position of said component and the other of which occurs or can occur after said component has travelled through a fixed or variable path portion subsequent to occurrence of the first event.

Ad additional object of the invention is to provide novel and improved means for processing various signals in an apparatus of the above outlined character.

The invention is embodied in an apparatus for monitoring the extent of recurrent movements of a first mobile component (e.g., a shuttle in a loom) through a predetermined portion of its path. The apparatus comprises first signal generating means (e.g., a first light source and a first optoelectrical transducer) for generating first signals whenever a second component (e.g. a rotary shaft in a loom) assumes a first position (e.g. the zero position of the shaft), second signal generating means (e.g., a second light source and a second optoelectrical transducer) for generating second signals in response to identical incremental advances of the second component (each such incremental advance may correspond to an angular movement of the aforementioned shaft through a minute acute angle, e.g., an angle of one degree), third signal generating means (e.g., a switch in the path portion of the shuttle which moves along a predetermined path and actuates the switch when it reaches a predetermined position of its path) for generating third signals whenever the component assumes a second position (i.e., the second positions of the component are determined by the third signal generating means), and a resettable counter or other suitable means for generating fourth signals (e.g., visually detectable or electric signals) each of which denotes the number of second signals generated by the second signal generating means during an interval which elapses between the generation of a first signal and the generation of the next-following third signal.

The counter may comprise a first (resetting) input which is connected with the first signal generating means by a pulse shaper or the like so that the counter is reset to zero in response to generation of each first signal, and a second input which receives second signals during each interval which elapses between the transmission of a first signal to the resetting input and the generation of the next-following third signal. The means for transmitting second signals to the second input of the counter may comprise a logic circuit having first, second and third inputs which are respectively connected with the first, second and third signal generating means and an output connected with the second input of the counter. When the first input of the logic circuit receives a first signal, it connects its second input with its output so that the counter can receive second signals, and the transmission of second signals to the counter is terminated when the third input of the logic circuit receives a third signal.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic elevational view of an apparatus which embodies one form of the invention;

FIG. 1a is an end elevational view of a disk-shaped encoding element as seen in the direction of arrow X in FIG. 1; and FIG. 2 is a diagram showing various signals which are generated and processed in the apparatus of FIG. 1.

DESCRIPTION OF THE PREFERRED EMBODIMENTS

Referring to FIG. 1, there is shown a shaft 1 which constitutes a mobile (rotary) component and is driven by the prime mover of a machine, e.g., a loom. The shaft 1 carries a disk-shaped encoding element 3. As shown in FIG. 1a, the encoding element 3 (hereinafter called disk for short) has an annulus of light-transmitting portions 3A (e.g., in the form of apertures) which travel between a light source 5a (disposed at one side of the disk) and a photoelectric (optoelectrical) transducer 7a (at the other side of the disk). The disk 3 also includes a further or additional light-transmitting portion 3B (e.g., an additional aperture) which is inwardly adjacent to the annulus of light-transmitting portions 3A and travels between a second light source 5b and a second photoelectric (optoelectrical) transducer 7b, once during each revolution of the disk 3. Thus, the transducer 7a of the second signal generating means 5a, 7a transmits (second) signals S2 at a frequency which is a function of the rotational speed of the shaft 1 and of the spacing between neighboring light-transmitting portions 3A. The transducer 7b of the first signal generating means 5b, 7b transmits a (first) signal S1 once during each revolution of the disk 3. The entire disk 3 may consist of light-transmitting material, as long as the difference between the transmissivity of its portions 3A, 3B on the one hand and the transmissivity of the remaining portion of the disk on the other hand suffices to insure that the transducers 7a and 7b respectively transmit signals only when they receive radiation via portions 3A and 3B. That angular position of the shaft 1 in which the light-transmitting portion 3B of the disk 3 is located between the light source 5b and the transducer 7b of the first signal generating means is the first or zero position of the shaft 1.

The (first) signal S1 which is generated by the transducer 7b can be called a zero signal, and such signal causes the generation of a modulated signal R which is transmitted to the resetting input a of a signal counter 11 through the medium of a pulse shaper circuit 9. The nature of signals R which the circuit 9 transmits to the input a of the counter 11 in response to reception of signals S1 is shown in the lowermost part of FIG. 2.

If the rotational speed of the shaft 1 is constant, the transducer 7a transmits second signals S2 at a constant frequency (see FIG. 2), and such signals are transmitted to a corresponding input b of a logic circuit 15 whose output d transmits modified second signals S2' to a second input b of the counter 11. An input a of the logic circuit 15 receives the signals S1, and this entails an adjustment of the logic circuit 15 so that the latter begins to transmit signals S2' to the input b of the counter 11. The arrangement may be such that the transducer 7a transmits a signal S2 in response to each incremental advance of the disk 3 through a minute acute angle, e.g., one degree, i.e., that the transducer 7a 360 signals S2 during each revolution of the shaft 1. FIG. 2 shows that the pulse shaper circuit 9 can transmit a resetting signal R in response to detection of the rising front flank of each signal S1.

The apparatus further comprises a third signal generating means including a switch 17 which is closed in a predetermined position of an element 117 which is moved by or should move in synchronism with the shaft 1. When the switch 17 is closed, it effects the transmission of a third signal S5 to a third input c of the logic circuit 15 whereby the latter's output d ceases to transmit modified second signals S2' to the input b of the counter 11. In other words, the counter 11 stores and preferably indicates the number of second signals S2' which are transmitted to the input b of the counter subsequent to transmission of a signal S1 to the input a of the logic circuit 15 and until the input c of the circuit 15 receives a third signal S5. Thus, the number of second signals S2' which are stored in the counter 11 at the time the logic circuit 15 receives a third signal S5 indicates the extent of angular displacement of the shaft 1 and disk 3 from a zero or starting angular position (in which the transducer 7b transmits a first signal S1) and the (second) angular position in which the switch 17 effects the generation of a third signal S5.

It is clear that the light sources 5a, 5b, the transducers 7a, 7b and the disk 3 constitute but one form of means for generating first and second signals (S1 and S2) in response to movement of the shaft 1 through zero position and in response to incremental advances of the shaft 1 through acute angles of predetermined magnitude. For example, the apparatus may embody magnetic, pneumatic or capacitive signal generating means without departing from the spirit of the invention. In each instance, the apparatus further comprises appropriate signal processing means (corresponding to the components 9 and 15) to insure that the counter 11 (or an analogous counter) will store those second signals which are generated in response to incremental advances of the shaft 1 between the instant of movement of the shaft 1 through zero position and the instant of generation of a third signal (S5) by the switch 17 or an analogous device which determines the second angular position of the shaft, namely, that position which is to be monitored and whose angular distance from the zero position should match or very closely approximate a predetermined value. The angular distance is denoted by the number of second signals S2' which are stored in the counter 11 when the input c of the logic circuit 15 receives a third signal S5. The switch 17 may constitute an optoelectrical, capacitive, mechanical or magnetic device. It is clear that the connection between the switch 17 and the input c may comprise a suitable pulse shaper or another signal processing unit for the third signals S5.

The frequency of signals S2 is a function of the angular velocity of the shaft 1 and of the spacing between neighboring light-transmitting portions 3A. The precision with which the angular position of the shaft 1 can be ascertained at the time the switch 17 effects the transmission of a third signal S5 depends solely on the spacing between neighboring light-transmitting portions 3A of the disk 3. The counter 11 may comprise digital means for displaying the angle between the zero position of the shaft 1 and that position in which the logic circuit 15 receives a third signal S5. Furthermore, the counter 11 can transmit modified fourth signals (whose intensity or another characteristic denotes the number of stored signals S2') to an evaluating circuit 19 which ascertains the average value of deviations of the actual angular distance between the zero position of the shaft 1 and the angular position at which the circuit 15 receives a third signal S5 during a predetermined number of successive revolutions of the shaft 1.

If the third signal S5 is generated by a nember which is driven independently of the shaft 1, the visible or other (fourth) signals which are furnished by the counter 11 can be utilized to initiate certain operations, e.g., a synchronization of the drive for the independently driven member with the drive means for the shaft 1.

By way of example, the apparatus of the present invention can be utilized with advantage for synchronization of the movement of the shuttle in a loom. Thus, the loom will be permitted to continue to run if the shuttle is on time in passing a predetermined position, and the loom will be stopped (either manually on reading of the information (fourth signal) which is displayed by the counter 11, or automatically in response to signals from the counter 11) when the shuttle passes the predetermined position while the loom has not yet reached or departed from a given position. The shuttle closes the switch 17 in a predetermined portion of its path, and the loom is arrested if the shuttle deviates in path from its standard throw. Conventional means for controlling the loom as a function of the deviation in timing or path of a shuttle from its standard throw are disclosed, for example, in aforementioned U.S. Pat. Nos. 2,670,014 and 3,326,246 to which reference may be had if necessary. It can be said that the switch 17 forms part of or is installed in a loom and that the switch actuating means 117 is part of a shuttle which closes the switch 17 when it reaches a predetermined portion of its path. The direction of movement of the part 117 of the shuttle along such path is denoted by the arrow A.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for monitoring the extent of recurrent movements of a monitored component in relation to the advances of a reference component, comprising first signal generating means for generating first signals whenever said reference component assumes a first position; second signal generating means for generating second signals in response to identical incremental advances of said reference component; third signal generating means for generating a third signal whenever said monitored component assumes a predetermined position in its path of movement, and fourth signal generating means connected to said first, second and third signal generating means and operative for generating fourth signals each of which denotes the number of second signals generated by said second signal generating means during an interval which elapses between the generation of a first signal by said first signal generating means and the generation of the next-following third signal by said third signal generating means.

2. Apparatus as defined in claim 1, wherein said fourth signal generating means comprises a resettable counter.

3. Apparatus as defined in claim 2, wherein said counter includes a resetting input; and wherein said fourth signal generating means further includes means for connecting said first signal generating means with said resetting input so that said counter is reset to zero in response to generation of each first signal.

4. Apparatus as defined in claim 3, wherein said counter further includes a second input; and wherein said fourth signal generating means further includes means for transmitting said second signals to said second input during the interval which elapses between the transmission of a first signal to said first input and the generation of the first third signal following the transmission of such first signal to said first input.

5. Apparatus as defined in claim 4, wherein said means for transmitting said second signals to said second input comprises a circuit having a first input connected with said first signal generating means, a second input connected with said second signal generating means, a third input connected with said third signal generating means, and an output connected with said second input of said counter.

6. Apparatus as defined in claim 4, wherein said reference component is a rotary component and said first signal generating means includes means for generating said first signals once during each revolution of said rotary component while said rotary component assumes a predetermined angular position, said second signal generating means comprising means for generating said second signals in response to successive angular displacements of said rotary component through angles of predetermined magnitude.

7. Apparatus as defined in claim 6, wherein each of said angles is a minute acute angle.

8. Apparatus as defined in claim 1, wherein said third signal generating means comprises a switch and means for actuating said switch in said predetermined position of said monitored component.

9. Apparatus as defined in claim 8, wherein said reference component is a rotary component said monitored component is a shuttle, and said means for actuating said switch includes a portion of said shuttle which repeatedly moves along said path and actuates said switch when said shuttle assumes said predetermined position in said path.

10. Apparatus as defined in claim 1, wherein each of said first and second signal generating means comprises an optoelectrical transducer.

* * * * *